No. 668,195. Patented Feb. 19, 1901.
E. LANGE.
CUTTER FOR WORMING WOOD SCREWS.
(Application filed May 28, 1900.)
(No Model.)

Witnesses:

Inventor:
Ernst Lange

UNITED STATES PATENT OFFICE.

ERNST LANGE, OF CRONBERG, GERMANY.

CUTTER FOR WORMING WOOD-SCREWS.

SPECIFICATION forming part of Letters Patent No. 668,195, dated February 19, 1901.

Application filed May 28, 1900. Serial No. 18,290. (No model.)

*To all whom it may concern:*

Be it known that I, ERNST LANGE, a subject of His Majesty the Emperor of Germany, residing at Cronberg, in the Province of Rhenish Prussia, Germany, have invented new and useful Improvements in Cutters for Worming Wood-Screws, of which the following is a full and clear specification.

In the manufacture of wood-screws for threading wire nails there are used frequently rotary cutters, which rotate in the horizontal plane and have their teeth engraved on the cylindrical part of the tool.

My invention has for its object a cutter which rotates in a vertical plane and has its teeth provided on its faces, so that when one side is dull the cutter may be used with the other sharp side.

Figure 1:
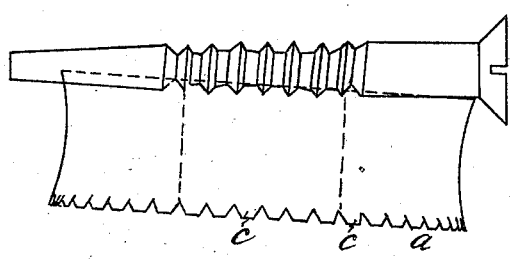
Figure 2:
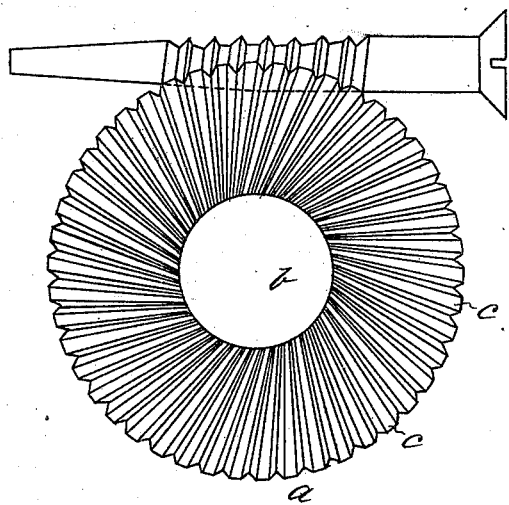
Figure 3:
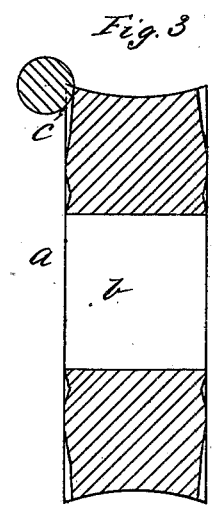

On the accompanying drawings, Figure 1 is a plan of the cutter shown in engagement with a screw-bolt. Fig. 2 is a front view of the same, and Fig. 3 a cross-section of Fig. 2.

The cutter consists of a cylindrical disk $a$, which is provided with a hole $b$, by means of which the tool may be fastened to a horizontal shaft. On either of its faces in the tool are cut the teeth $c$, which, running in a slanted direction, are on the circumference of the disk somewhat deeper than at their running-out point. To obtain sharp edges, the cylindrical portion may be chamfered.

The cutter revolves in working along the bolt, beginning its operation from the head side. One revolution produces a thread on the nail, and in being carried along the same the nail is threaded, receiving a gimlet-point when the cutter is correspondingly moved and pressed toward the nail, for which purpose it is moved in an oblique line, as shown in Fig. 1. The nail is constantly engaged by three or four teeth, of which the first one cuts the rough thread while the others are polishing the same.

As may be easily understood, the cutter may be used with both of its sides by changing the same, and both cutting edges may be easily sharpened by an emery-wheel which engages the cylindrical portion of the disk.

What I claim is—

A cutter for worming wood-screws consisting of a cylindrical disk adapted to turn on or with a horizontal bolt and having teeth on both vertical faces running radially and in a slanted direction from the center to the periphery forming there vertical cutting edges adapted to worm a wood-screw.

ERNST LANGE.

Witnesses:
   OTTO KÖNIG,
   T. A. RITTERSHAUS.